United States Patent [19]

Case

[11] Patent Number: 4,579,228
[45] Date of Patent: Apr. 1, 1986

[54] TICKET DIVERTER MODULE
[75] Inventor: Robert F. Case, San Diego, Calif.
[73] Assignee: Cubic Western Data, San Diego, Calif.
[21] Appl. No.: 547,335
[22] Filed: Oct. 31, 1983
[51] Int. Cl.$^4$ .................... B07C 5/36; G06K 13/12
[52] U.S. Cl. .................... 209/563; 209/583; 101/2; 235/480
[58] Field of Search ............... 209/534, 569, 583, 656, 209/657, 563–566; 101/2; 235/379, 477, 480; 271/65, 186, DIG. 9

[56] References Cited

U.S. PATENT DOCUMENTS

| | | | |
|---|---|---|---|
| 3,850,299 | 11/1974 | Kreitzer | 209/534 X |
| 4,164,649 | 8/1979 | Anderegg et al. | 235/480 |
| 4,176,855 | 12/1979 | Ingram, Jr. et al. | 235/480 |
| 4,251,000 | 2/1981 | Templeton | 209/547 |
| 4,318,484 | 3/1982 | Stiernspetz | 209/534 |
| 4,357,530 | 11/1983 | Roes et al. | 235/384 |
| 4,374,564 | 2/1983 | Miller et al. | 209/583 |
| 4,416,378 | 11/1983 | Miller | 209/583 |

FOREIGN PATENT DOCUMENTS

| | | |
|---|---|---|
| 1223555 | 2/1971 | United Kingdom . |
| 1223556 | 2/1971 | United Kingdom . |
| 1240241 | 7/1971 | United Kingdom . |
| 2090686 | 7/1982 | United Kingdom . |

Primary Examiner—Robert B. Reeves
Assistant Examiner—Edward M. Wacyra
Attorney, Agent, or Firm—Brown, Martin & Haller

[57] ABSTRACT

A ticket diverter for use in conjunction with a ticket processing apparatus. The diverter has an entry passage through which a ticket enters and an exit passage through which the ticket is expelled. A stationary diverter ramp deflects the ticket from the entry passage to the exit passage. The ticket is propelled in the exit passage by a reversible exit drive roller toward either a dispensing outlet or a capture outlet.

2 Claims, 4 Drawing Figures

TICKET DIVERTER MODULE

BACKGROUND OF THE INVENTION

The present invention relates to ticket handling and processing equipment and pertains particularly to a ticket diverter for providing a branch in a path which a ticket follows through such equipment.

Automated systems for handling tickets, credit cards, and the like are increasingly in evidence. Such systems are normally useful with, for example, transportation systems and banking operations wherein they are utilized for automatically dispensing or processing tickets, credit cards, money, or similar objects. Such automatic systems increase the efficiency, security, and reliability of dispensing and processing operations. Because they are used frequently and over a long period of time, the equipment which makes up such systems must be simple, reliable, and maintainable.

One example of a ticket handling system for use in an automatic ticket processing system is found in U.S. Pat. No. 4,357,530 wherein a ticket is propelled through a series of processing equipments in a generally linear path. In systems exemplified by the referenced patent, a need exists to provide a branching capability in the path traversed by a ticket, which is satisfied by the provision of a diverter apparatus including a pair of branching passageways which communicate with the throughput passageway of the ticket processing system.

Diverter modules which perform this branching function are known in the art and are represented by the devices disclosed in U.S. Pat. No. 3,850,229 wherein an apparatus is disclosed which performs the branching function is implemented by means of a rotary member which is mounted on a solenoid for rotating between two positions. In a first position, a slot in the guide member communicates with a linear throughput passage through which a credit card is propelled toward an outlet. When it is necessary to capture the card, the guide member is rotated to its second position and deflects the moving card into a second passageway through which it travels to a collection box. A similar rotatable guide mechanism is disclosed in U.S. Pat. No. 4,251,000 wherein two opposing plates are mounted upon a rotatable hub which is driven by a solenoid between two positions. U.S. Pat. No. 4,374,564 discloses a diverter apparatus in which a rotatable diverter plate having a pair of angled diverter surfaces is turned in one direction to deflect a ticket from the throughput passageway to one diversion channel and turned in another direction to divert the ticket into a second channel. Manifestly, the reliability of the apparatus disclosed in these patents can be degraded if the rotating parts jam in one position or fail to rotate fully.

Another type of diverter apparatus is taught in U.S. Pat. No. 4,318,484, wherein a device sorts out individual articles and diverts or captures articles which differ from a predetermined main article standard. This apparatus diverts nonstandard articles by reversing the direction of propulsion in a throughput passageway, which feeds the article to be diverted to a pair of rollers having axes disposed in a plane forming an acute angle to the throughput passage. The article is nipped by the canted rollers and diverted away from the throughput passageway. In this device the articles to be diverted during sorting depend upon the movement of a multiplicity of belts between which the article is nipped. As is known, such belts can stretch or break during operation which would result in the failure of the diverter to operate.

In the diverter disclosed in U.S. Pat. No. 4,416,378, which is assigned to the assignee of this application, a flexible leaf spring extends from a diversion channel into a diverter throughput channel which communicates with the throughput passage of a ticket transport apparatus. A ticket is propelled through the diverter and over the spring. The spring is thereby biased downward to permit the ticket to pass. When the ticket passes, the spring flexes up to contact the top of and close the diverter throughput passage. If the ticket is rejected and propelled back to the diverter from the transport apparatus, the spring curvature guides it from the throughput passage to a diversion channel. The flexible spring can lose flexibility or be jammed short of the top of the passageway. In either case, a ticket might not be diverted, thus causing the apparatus to malfunction.

Hence, the prior art discloses the need for a reliably operating diverter. Preferably, the diversion performed by the apparatus would be effected without the use of moving diverter parts or belts, either of which can fail to operate properly when diversion of an object is required.

SUMMARY AND OBJECT OF THE PRESENT INVENTION

The present invention provides an improvement over the foregoing diverter modules by utilizing a stationary diverting mechanism which will deflect a ticket or other flat, flexible object from a throughput passageway into an exit passageway within which the ticket or other object may be propelled to one of two exits. One of the two exits constitutes a dispensing outlet, the other, a capture outlet. Thus, the reliability of the present invention is enhanced by the provision of a diverting or branching capability which does not depend upon a positionable, flexible, or movable diverter mechanism to accomplish the desired deflection.

Accordingly, it is a principal objective of the present invention to provide an improved diverter having a stationary diversion mechanism.

This and other objects of the invention will become readily apparent from the ensuing description when taken together with the accompanying drawings.

DETAILED DESCRIPTION OF A PREFERRED EMBODIMENT

Figure 1:
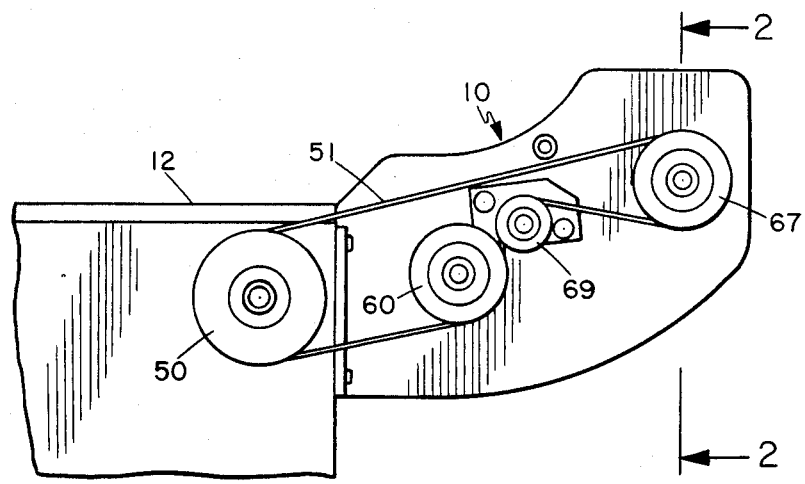
FIG. 1 is a side plan view of the diverter illustrating it positioned in an operable adjacent relationship with a ticket transport apparatus.

Turning to FIG. 1 of the drawings, there is illustrated the diverter apparatus of the invention, indicated generally by the numeral 10, in operable engagement with an adjacent transport device 12. This arrangement represents the normal positioning of the diverter in a typical ticket processing system. However, it should be obvious to those skilled in the art that the diverter may be positioned at various positions within and in cooperative relationship with various units of such a system. As will be further understood, such systems are useful for handling, for example, tickets, credit cards, or money, and use of an exemplary term to indicate the object which is being acted upon should not be limiting in the conventional sense, but should also extend to other similar items.

The primary function of the apparatus of the invention is to provide an alternate route for placement of a ticket being provided from the transport mechanism 12 to the diverter mechanism 10 such as when the ticket is invalid or unverified.

Figure 2:
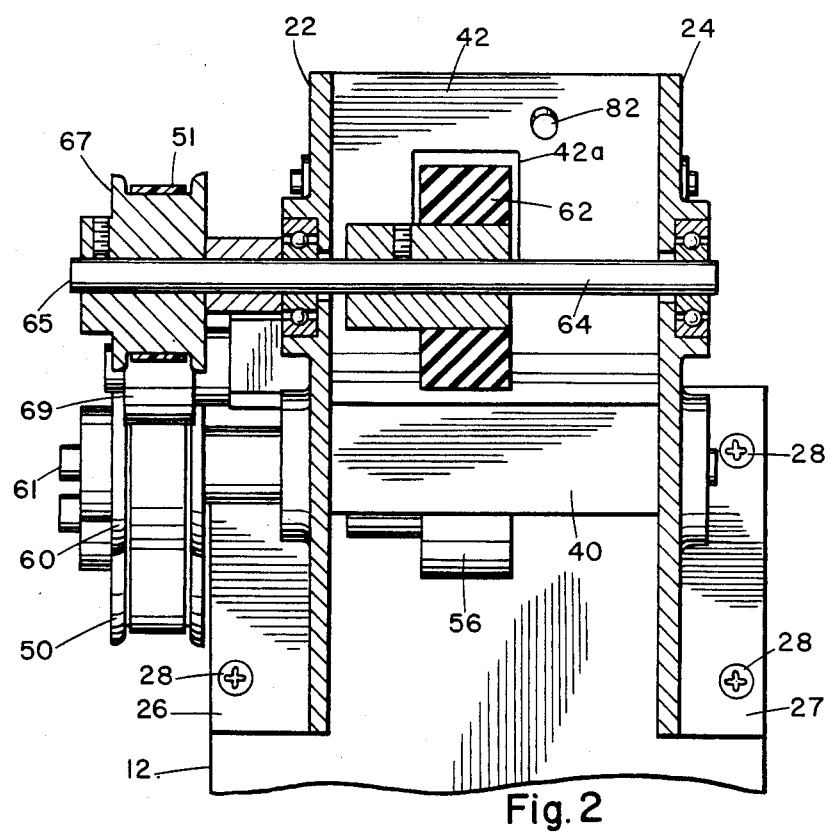
FIG. 2 is an enlarged sectional view of the diverter taken along line 2—2 of FIG. 1.
Figure 3:
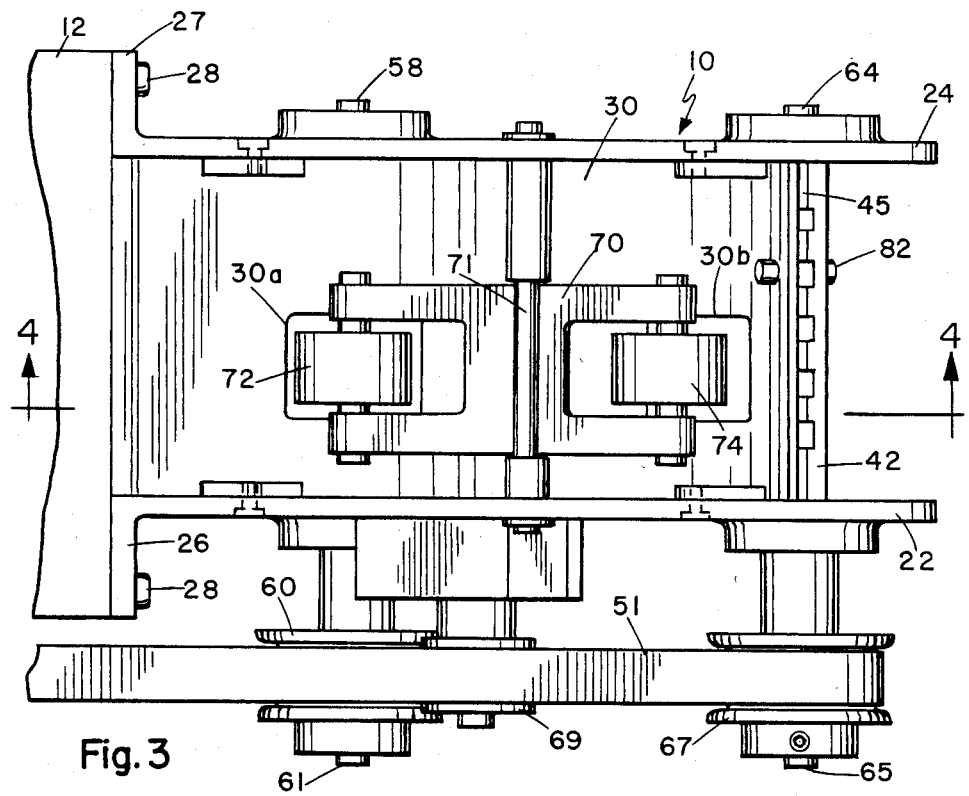
FIG. 3 is a top plan view of the diverter.
Figure 4:
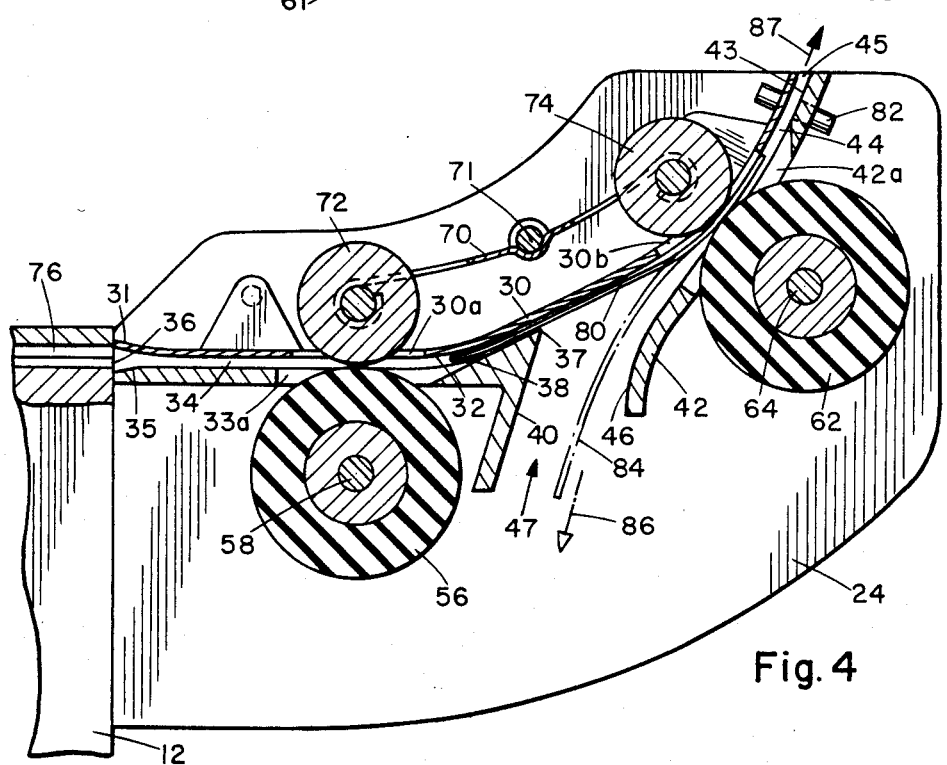
FIG. 4 is a sectional view taken along line 4—4 of FIG. 3, illustrating the arrangement of the forward and exit passages of the diverter module and the stationary ramped diversion surface.

Turning now to FIGS. 2, 3 and 4, the transport apparatus comprises a housing including two side plates 22 and 24 each having end mounting flanges 26 and 27, respectively, which permit the diverter apparatus to be mounted to, for example, the transport 12 by means of screws 28. The housing further comprises an upper channel plate 30 having a pair of apertures 30a and 30b and a slightly flared end 31. The plate 30 is held between the side plates 22 and 24 by any appropriate means, for example, the upper plate may be welded or braised to either or both of the side plates. As is evident in FIG. 1, the upper plate 30 has a generally arcuate shape which gives one of its surfaces 32 a generally concavce outline.

A lower forward plate 33, having a rectangular aperture 33a, is also fixedly held between the side plates 22 and 24 in a spaced position relative to the flanged end 31 of the upper plate 30 to form a passageway 34 therebetween. The forward plate 33 includes a flanged end 35 which cooperates with the flanged end 31 of the upper plate 30 to define an inlet 36. As is evident in FIG. 4, the lower plate 33 also includes a forward tip 37 to which the lower forward plate 33 transitions over a ramped diverter portion 38. Extending downwardly from the tip 37 is an angled channel section 40.

A lower exit plate 42, having an aperture 42a, is also fixedly held between the side plates 22 and 24 adjacent the upper plate 30 at the end opposite the flanged end 31. The exit plate 42 has an upper surface 43 which cooperates with the upper plate 30 to form an exit passageway 44, one end of which opens to a dispensing outlet 45. The exit plate 42 also includes a curved lower surface 46 which cooperates with the lower channel section 40 of the forward plate 32 to provide a capture outlet 47.

The drive mechanism of the diverter of the invention can be understood with reference to FIGS. 1, 2, 3 and 4. The drive mechanism includes a reversible drive motor (not shown) having an output pulley 50 which is shown located on the transport apparatus 12 in FIG. 1. This arrangement is presented only for the purpose of illustrating the operational cooperation which the diverter can have with an associated piece of equipment, and is not intended to be limiting. It should be evident that such a motor and its controlling circuitry, which will be described in greater detail hereinbelow, can be positioned at any desirable point relative to the diverter, or on the diverter itself. The motor can comprise both a reversible electric motor and a control circuit (not shown) which responds to signals provided by sensor (also not shown) located in the passageway of the transport 12 through which a ticket or other object is propelled. Such motors and associated control circuits are well-known in the art. Illustrative examles of motors and control circuits are found, for example, in U.S. Pat. No. 4,357,530 and U.S. Pat. No. 4,377,828, both of which are incorporated herein by reference. The drive power from the motor pulley 50 is supplied by means of an endless drive belt 51.

The drive mechanism for the entry passage 34 includes a roller 56 mounted on a drive shaft 58 which is journaled in bearings in the plates 22 and 24. The driver roller 56 extends through the aperture 33a in the lower forward plate 33. A pulley 60 is journaled to one end 61 of the drive shaft 58 on the outside of the side plate 22. The drive mechanism for the exit passageway 44 consists of a drive roller 62 mounted on a drive shaft 64 which is journaled between the side plates 22 and 24. One end 65 of the shaft 64 which extends through to the outside of the side plate 22. As pulley 67 is journaled to the outside end 65 of the drive shaft 64. An idler pulley 69 is rotatably journaled to the outside of the side plate 22 and may be utilized to adjust or maintain tension in the belt 51 which extends around and engages the pulleys 60 and 67, as illustrated in FIG. 1.

A tensioned pinch roller assembly 70 is mounted on a stationary shaft 71 which extends between the side plates 22 and 24. The pinch roller assembly 70 includes pinch rollers 72 and 74 which are urged by the spring bias of the assembly through the upper plate apertures 30a and 30b, respectively. The pinch rollers 72 and 74 contact the rollers 56 and 62, respectively, in a biased contacting engagement.

In operation, the motor may be drivingly coupled to propelling rollers (not shown) in the transport apparatus 12 which propel a ticket in a transport passage 76 toward the inlet 36 of the diverter 10. At the same time, the pulleys 60 and 67, which are drivingly coupled to the motor pulley 50 by the belt 51, rotate in a direction which will cause the ticket to be nipped between the rollers 56 and 72 and propelled thereby through the entry passage 34 in the direction of the forward tip 37.

As the ticket moves toward the forward tip 37, the ramp 38 causes its forward motion to be deflected toward the upper surface 43 of the lower exit plate 42 and therealong into the exit passage 43. The disposition of the ticket on the ramp 38 is indicated by 80. In the exit passage, the leading edge of the ticket 80 is nipped between the rollers 62 and 74 and propelled through the exit passageway 44 in the direction of the outlet 45. When the leading edge of the ticket 80 passes a sensor 82 (which can comprise, for example, a light emitting diode and a photodetector) the sensor provides a signal over a conductor pathway (which is not shown) to the control circuit of the drive motor.

At this point in the passage of the ticket 80 through the diverter 10, the control circuit makes a decision to permit the ticket 80 to be propelled out of the diverter 10 through either dispensing outlet 45 or capture outlet 47. For example, if the ticket is invalid or fully subscribed, as may have been detected by transducers (not shown) adjacent the passageway 76 of the transport which are capable of sensing fare information placed on the ticket, the ticket can be diverted through the capture outlet 47 by reversing the direction of rotation of the motor pulley 50. Reversal of the direction of rotation will cause the drive roller 62 to reverse its direction of rotation and to propel the ticket along the lower surface of the lower exit plate 42 and through the capture outlet 47 which may communicate with, for example, a chamber wherein invalid tickets are held. Movement of the ticket in this direction is indicated by the dashed outline 84 and arrow 86. Alternatively, should the ticket be valid or not yet fully subscribed, the control circuit may cause the motor and pulley 50 to continue to rotate in the forward direction thereby rotating the drive roller 62 in the direction which propels the ticket 80 toward and through the dispensing outlet 45, as indicated by the arrow 87. Motor control circuits and sensors having the described capabilities, are fully disclosed in the patents incorporated hereinabove by reference.

The diverter apparatus above-described can be used in a variety of ticket processing systems, or at different points in a given processing system. The diverter can, for example, be used in an entry gate, into a transportation system to return partially cancelled tickets to a system patron through the dispensing outlet 45, or to capture fully cancelled tickets in a disposal bin positioned under the capture outlet 47.

Thus, while I have illustrated and described my invention by means of a specific embodiment, it is to be understood that numerous changes and modifications may be made therein without departing from the spirit and scope of the invention as defined in the appended claims.

What is claimed is:

1. In a diverter for handling flexible tickets having opposite first and second edges, said diverter including drive control means responsive to predetermined characteristics of said tickets for providing a dispensing signal to dispense a ticket or a capture signal to capture a ticket, the improvement comprising:

an entry passage through which a ticket enters said diverter;

an exit passage with two opposite ends and having a dispensing outlet at one of said ends and a capture outlet at the other of said ends;

means for propelling a ticket through said entry passage toward said exit passage;

an arcuate surface defining a substantially curved path from said entry passage to said exit passage;

a stationary diverter ramp disposed adjacent said arcuate surface and said capture outlet, said ramp having a first surface for diverting a first edge of a ticket along said arcuate surface into said exit passage when said ticket is being propelled in said entry passage toward said exit passage and having a second surface for diverting a second edge of said ticket into said capture outlet when said ticket is being propelled in said exit passage toward said capture outlet;

a single reversible drive means disposed in said exit passage between said dispensing and capture outlets for receiving the first edge of a ticket when said ticket is deflected by said first diverter ramp surface and propelling said ticket to a position in said exit passage where said first edge is between said reversible drive means and said dispensing outlet and the second ticket edge is between said second diverter ramp surface and said capture outlet and for, when said ticket has been propelled to said position, propelling said ticket through said dispensing outlet in response to a dispensing signal or propelling said ticket through said capture outlet in response to said capture signal; and sensing means adjacent said exit passage between said reversible drive means and said dispensing outlet for, when a ticket has reached said position, providing a presence signal to enable the provision of said dispensing signal or said capture signal.

2. The improvement of claim 1 wherein said reversible drive means comprises a single set of drive rollers in said exit passage.

* * * * *